April 14, 1964   M. E. WILKE ETAL   3,129,118
RESERVE ELECTRIC BATTERY WITH COMBINED
ELECTRODE AND SEPARATOR MEMBER
Original Filed May 26, 1959   2 Sheets-Sheet 1
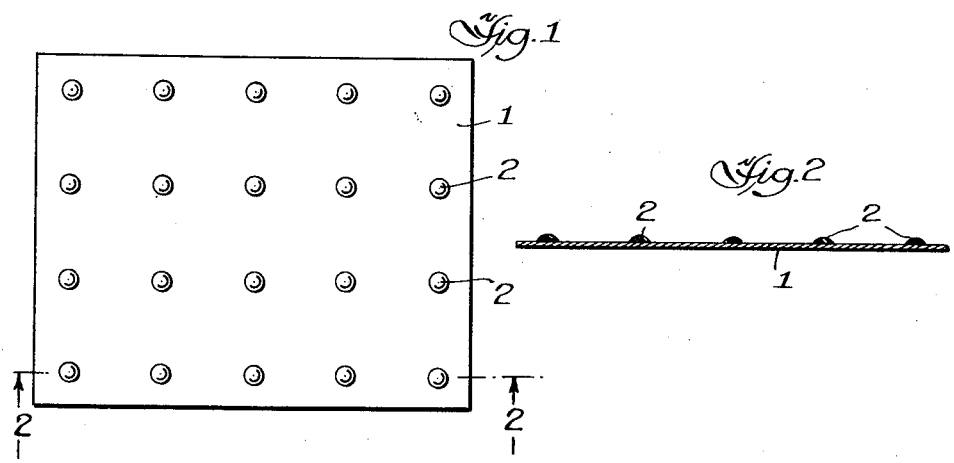
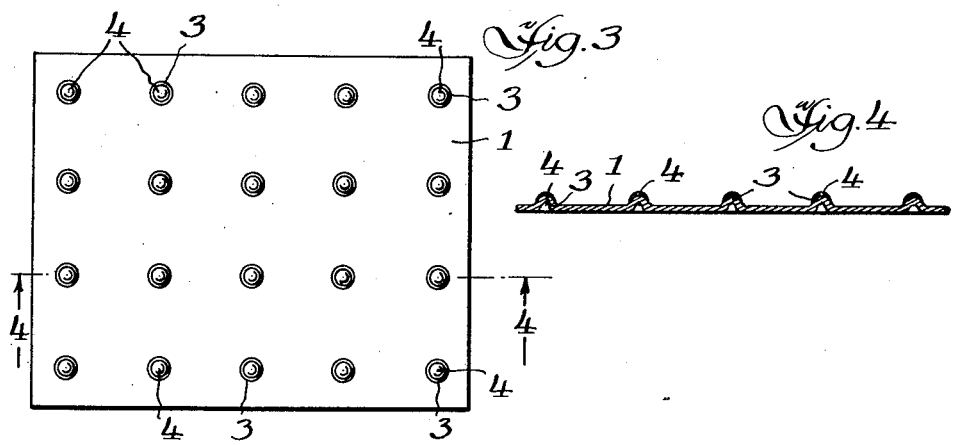
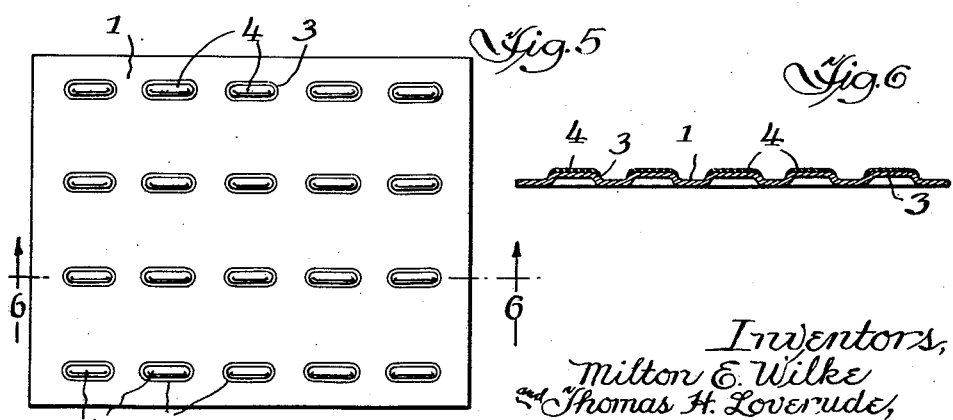
Inventors,
Milton E. Wilke
and Thomas H. Loverude,
By: Darbo, Robertson & Vandenburgh Attys.

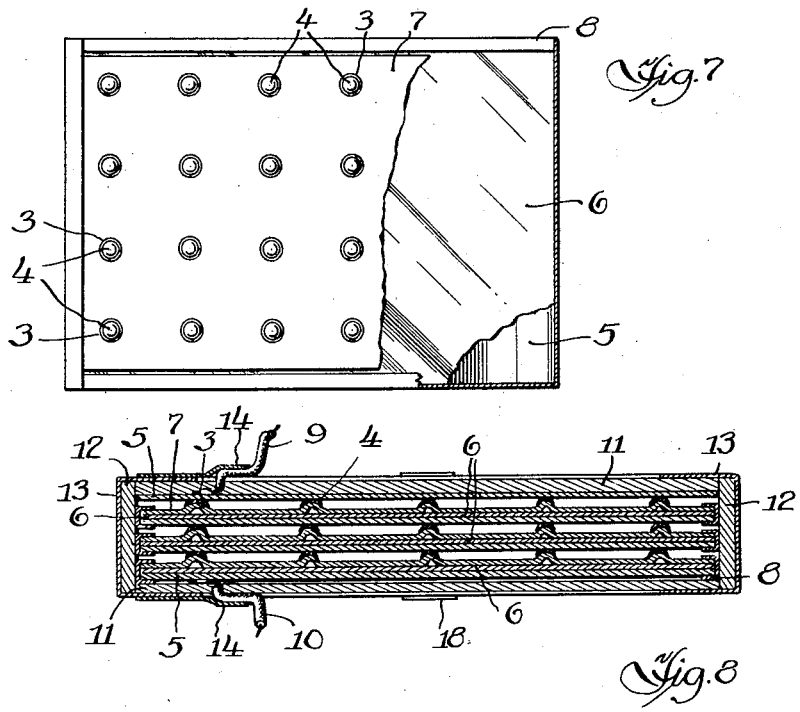
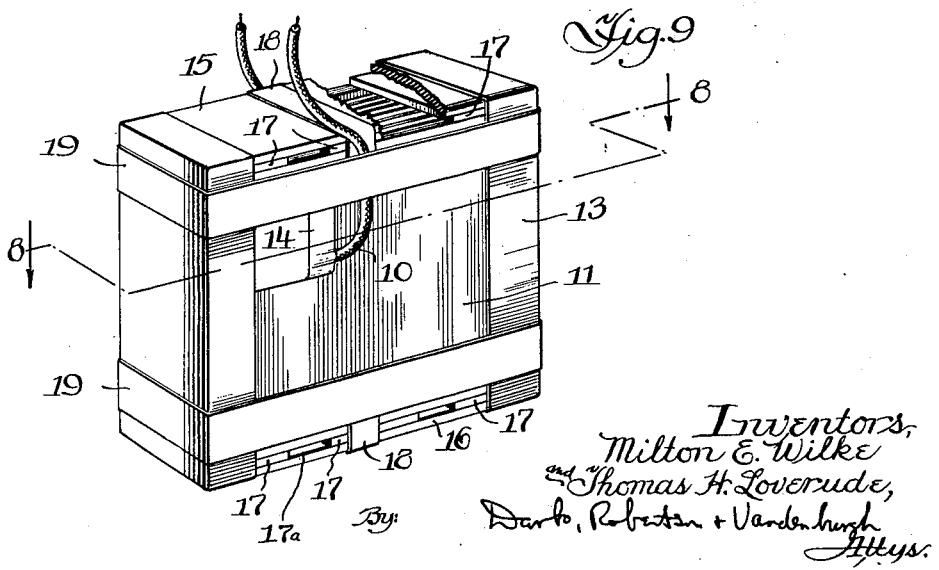

United States Patent Office 3,129,118
Patented Apr. 14, 1964

3,129,118
RESERVE ELECTRIC BATTERY WITH COMBINED ELECTRODE AND SEPARATOR MEMBER
Milton E. Wilke and Thomas H. Loverude, Freeport, Ill., assignors to Servel, Inc., Evansville, Ind., a corporation of Delaware
Original application May 26, 1959, Ser. No. 815,859, now Patent No. 3,061,659, dated Oct. 30, 1962. Divided and this application Mar. 23, 1962, Ser. No. 182,055
4 Claims. (Cl. 136—100)

This invention relates to electric primary batteries of the reserve type and more particularly to a novel separator which is used to maintain proper spacing between the positive and negative electrodes of each cell of such batteries.

Reverse batteries have assumed a position of prime importance, particularly for military use. They have the advantage over conventional batteries in that they may be stored almost indefinitely without loss of capacity, and are ready for use immediately upon activating. Moreover, small reserve batteries, particularly those comprised of magnesium anodes and silver chloride cathodes, can furnish extremely high currents in relation to their size and weight. These batteries may be used to power such military devices as proximity fuses, emergency signalling apparatus, and sonobuoys.

Reserve batteries of the type described are generally comprised of a plurality of cells each comprising a sheet-form magnesium anode, a sheet-form silver chloride cathode, and a separator contained therebetween comprised of a plurality of layers of a bibulous material such as webril. A silver foil sheet is usually spot welded or otherwise electrically and mechanically fastened to one side of the magnesium anode and the unit thus formed positioned in the battery so that the exposed surface of the silver foil engages the silver chloride electrode. Individual cells are placed in series and taped together to form a battery. The batteries are activated by immersing them either in prepared electrolyte or in sea water.

For some uses, as for example, in the powering of sonobuoys where the battery and accompanying apparatus are dropped from a substantial height into the sea, it is highly desirable that the battery absorb the sea water or other electrolyte rapidly enough and in sufficient quantities for immediate activation and generation of electricity.

It is an object of the present invention to provide a combination electrode and separator for reserve battery cells which will allow sea water or other electrolyte to fill the battery and activate it immediately upon its being dropped or otherwise immersed into a body thereof.

It is further an object to provide such a structure which will allow large amounts of the electrolyte solution to enter the battery, and to enable it to supply a large current, when required, over a long period of time.

It is further an object to provide such a structure which may be easily and inexpensively fabricated, and which is rugged in structure and insensitive to extreme shock.

Other objects and advantages of the present invention will become apparent from the following description and accompanying drawings in which:

FIG. 1 is a plan view of one example of the combined electrode and separator of the present invention;

FIG. 2 is a cross-sectional view taken at the line 2—2 of FIG. 1;

FIG. 3 is a plan view of a different form of the combined electrode and separator member of the present invention;

FIG. 4 is a cross-sectional view taken at line 4—4 of FIG. 3;

FIG. 5 is a plan view of another form of the combined electrode and separator member of the invention;

FIG. 6 is a cross-sectional view taken at line 6—6 of FIG. 5;

FIG. 7 is a plan view in somewhat broken form of an assembly unit according to the invention;

FIG. 8 is a cross-sectional view taken in line 8—8 of FIG. 9 showing the battery construction in detail, and FIG. 9 is a perspective view of an example of a battery embodying the invention.

According to the present invention, a novel combination electrode and separator member may be provided by forming a plurality of mounds of an electrically insulating organic plastic composition on the surface of one of the electrodes of a reserve cell by applying the composition in liquid form to such surface, and subsequently causing the plastic composition to set to the solid state. After setting, the mounds are highly adherent to the electrode. When the complementary electrode is then placed thereover, the mounds electrically insulate, and provide proper spacing between, the electrodes for ready access of the activating electrolyte to the electrode surfaces.

It has been found that certain improvements in such a structure may be obtained if the electrode is first embossed to form spaced protrusions, either circular or elongated, and tips of the protruding surfaces are then covered with an insulating organic plastic composition to form mounds similar in effect to those described above.

Referring to the drawings, FIGS. 1–6 show three alternative forms of the individual combined electrode and separator according to the present invention. The separator mounds may be formed on either the cathode or the anode. However, it is preferred to form them on the cathode when the cathode is composed of a material having high mechanical strength such as silver chloride either in the rolled or electro-deposited form. When the mounds are formed on the anode, the surface area of the magnesium exposed to the electrolyte is reduced, so that the current supplying capacity may be adversely affected.

In FIGS. 1 and 2 is shown an electrode 1 having a plurality of insulating mounds 2 in adherence with the surface thereof. In this embodiment the surface of the electrode is flat. The complementary electrode may be laid upon the mounds in forming the cell.

FIGS. 3 and 4 illustrate a modification of the embodiment shown in FIGS. 1 and 2. Here the electrode 1 is first embossed or dimpled to form raised spherical protrusions 3 rising above the surface of the electrode 1. The tops of the protrusions provide small plateaus which are coated with a layer 4 of the insulating composition of the invention such as that described in connection with FIGS. 1 and 2 to form the insulating mounds. This structure has several advantages over that of FIGS. 1 and 2. A smaller amount of the insulating composition may be used to give an equivalent elevation above the electrode surface. Moreover, this structure lends itself to a simple method for the application of the insulating composition, that is by laying the electrodes upon a flat surface containing a thin layer of the composition in liquid form so that the tops of the elevation are covered. Alternatively the tops may be coated by means of a roller. Following application, the composition is caused to set, as by heating.

FIGS. 5 and 6 illustrate a further modified form, similar to FIGS. 3 and 4, but wherein the protrusions are in the form of ridges 3 providing elongated plateaus for the reception of the insulating composition layer 4. The ridges should be preferably oriented in the direction in which the incoming electrolyte will travel in the cell so that the least resistance to flow will be encountered by the electrolyte.

In FIG. 7, there is shown an assembly unit utilizing a separator according to the present invention. This unit comprises a sheet-form magnesium electrode 5, a sheet of silver foil or silver plated copper foil 6, which is preferably spot welded to the magnesium sheet, and a silver chloride sheet 7. The silver chloride sheet is preferably glued to the silver foil sheet at a few localized areas with a rubber cement to provide mechanical strength. The unit is held together by a tape border 8 or other suitable means. Prior to assembly, the silver chloride sheet may be embossed to produce a plurality of circular protrusions 3. The top surfaces thereof are subsequently coated with the insulating adhesive composition 4 of the invention. The silver chloride sheet is so inserted in the unit that the coated plateaus are exposed. As thus assembled, the unit (herein referred to as an "assembly unit"), is not in effect a complete cell, but rather comprises the cathode, separator and silver terminal sheet of one cell, in contact with the magnesium anode of another cell. A battery is formed by stacking a plurality of assembly units. A single extra magnesium sheet is placed at the positive end of the stack. The stack is then taped together to form a battery. The added magnesium sheet does not function as an anode, but rather as a support for the silver foil and silver chloride sheet, and as a positive electrical terminal means. A cross-section of such a battery is shown in FIG. 8, which is taken at the line 8—8 of FIG. 9. To complete the battery, terminal wires 9 and 10 are welded to the terminal plates of the battery. The battery assembly is completed by encasing the units in a container formed by two side boards 11, two end boards 12, and top and bottom boards 15 and 16. The boards are held together by strips of tape 13, and should preferably be comprised of either a rigid plastic material or impregnated paperboard. Short strips 14 are placed about the terminal wires 9 and 10 at their point of emergence from the battery for protection. The complete external construction of the battery can be seen in FIG. 9. Discontinuous spacers 17 are provided to form ports 17a for the entrance of the activating electrolyte. A central strip of tape 18 aids in supporting the structure. Horizontal tapes 19 also aid in retaining the assembly. Anodes suitable for the present cell are generally fabricated from sheet-form magnesium. Other suitable anodic metals such as zinc may be used where lower voltages and currents are permissible.

The preferred cathode depolarizer is silver chloride, although other suitable depolarizers such as cuprous chloride may be used. The depolarizer may be formed by rolling a slab of silver chloride through a rolling mill at temperatures sufficiently elevated to render the material malleable. The silver chloride cathode may also be formed by electrolysis, according to known methods. The surfaces of the cathode may be developed in a photographic developer to form a thin silver layer thereon for better current distribution along the cathode.

The separator may be applied to the flat surface of the silver chloride sheet in the form of solid plastic mounds. Alternatively, the mounds may be prepared by first embossing the silver chloride sheet by means of embossing rollers to form either circular or elongated protrusions. The insulating composition is then applied to the top surfaces of the protrusions to form the insulating mounds. The protrusions should be spaced at approximately one half inch intervals from each other in each direction. This distance may be varied as the thickness of the silver chloride electrode is varied.

The organic plastic material which is used for making the separator of the present invention must have certain physical properties. First, it must be liquid in the form in which it is applied at temperatures substantially below the melting point of the electrode to which it is to be applied. Second, it must be capable of being set or cured so that it will exist as a solid at a temperature at least as high as the maximum temperature to which the battery is to be subjected during operation. Third, it must have good adhesive properties for the particular electrode. Finally, it must be a good electrical insulator. The composition may be comprised of either synthetic plastics or natural plastics. Generally, plastics which may be applied in liquid form at temperatures below 400° F. are preferred, since the application of the composition at such lower temperatures greatly facilitates the construction of the electrode and separator unit. The preferred composition is a plastisol comprised of vinyl chloride polymer or copolymer, since it may be applied in that form in the liquid state substantially at room temperature, and then heated to cause the composition to set to the solid state. Although the solid plastisol is still of a thermoplastic nature, its fusion point is substantially higher than any temperature that might be encountered during the operation of reserve batteries. Other thermoplastic resins such as polystyrene or polyethylene may be used but must be applied in the molten form. Thermosetting resins may also be used. Liquid epoxy resins have been found to be extremely well suited and may be applied in the liquid form at room temperature, and subsequently cured in the presence of a catalyst, and with heat where necessary, to the solid state. Phenolic resins may also be applied either at room temperature or in the molten form and subsequently cured. Of the natural plastics, materials such as rosin or waxes may be used, providing their melting point is sufficiently high.

One of the main benefits to be derived from the practice of the present invention is that the insulating composition may be easily and inexpensively applied to the electrodes in the forms described by any one of several inexpensive mass production means. The mounds may be formed on an unembossed electrode surface by placing a template having a plurality of holes over the electrode, pouring globules of the plastic material into the holes, removing the template, and heating or setting the resin to cause it to solidify. The mounds may also be applied in the liquid form by means of a printing roll. When the electrode is first embossed, the embossed protrusions may be placed over a flat surface containing a thin layer of the liquid plastic. Only a sufficient amount will adhere to the tip or plateau of each protrusion to cause the tip to become insulated. The liquid plastic material may also be applied to the protrusion surface by means of a printing roll which is sufficiently large to make contact with only the tip thereof.

Batteries assembled from units having a combined electrode and separator according to the present invention are extremely sturdy and resistant to shock, since the electrodes are firmly separated by the mounds. Moreover, since most of the space between the electrodes of each cell is empty space, the cells become filled with electrolyte extremely rapidly when they are immersed in sea water or in any other activating electrolyte. As a result, the full charge may be almost instantaneously drawn from the battery. The amount of the electrolyte may be controlled by controlling the size of the mounds, or by controlling the size of the embossments. Finally, the combined electrode and separator element may be easily and cheaply produced by mass production methods.

Although the present invention has been described in relation to only relatively few embodiments, it is to be understood that many variations may be practiced by those skilled in the art without departing from the spirit and scope of the invention as defined by the appended claims.

This application is a division of application Serial No. 815,859, filed May 26, 1959, now Patent No. 3,061,659, dated October 30, 1962.

Invention is claimed as follows:

1. An assembly unit for a reserve battery having elements comprising a magnesium anode, a combined cathode and separator member comprising a sheet-form silver chloride electrode having on a surface thereof a plurality of spaced mounds of a solid electrically insulating organic plastic composition, said composition comprising a plastisol of a polymer of vinyl chloride and being characterized in that it is capable of being provided in liquid form at temperatures below the fusion temperature of said cathode, and means for binding said elements together.

2. An assembly unit for a reserve battery having elements comprising a magnesium anode, a combined cathode and separator member comprising a sheet-form silver chloride electrode having on a surface thereof a plurality of spaced mounds of a solid electrically insulating organic plastic composition, said composition comprising a phenolic resin and being characterized in that it is capable of being provided in liquid form at temperatures below the fusion temperature of said cathode, and means for binding said elements together.

3. An assembly unit for a reserve battery having elements comprising a magnesium anode member and a silver chloride cathode member, one of said members being in sheet form with a plurality of spaced embossments providing protrusions at one side of the sheet, said embossments being covered to form mounds, said covering being formed of an electrically insulating phenolic resin composition characterized in that it is capable of being provided in liquid form at temperatures below the fusion temperature of said one member and thereafter set to the solid state, said members being positioned with said mounds of said one member being in juxtaposition to the other member to space the members from each other, and means to hold said members in said position.

4. An assembly unit for a reserve battery in accordance with claim 3 wherein the member having embossments providing protrusions thereon is the silver chloride cathode member.

References Cited in the file of this patent

UNITED STATES PATENTS 1,332,483     Bridge  ------------------ Mar. 2, 1920